United States Patent

Randall

[11] 3,883,336
[45] May 13, 1975

[54] METHOD OF PRODUCING GLASS IN A FLAME
[75] Inventor: Eric N. Randall, Bath, N.Y.
[73] Assignee: Corning Glass Works, Corning, N.Y.
[22] Filed: Jan. 11, 1974
[21] Appl. No.: 432,573

[52] U.S. Cl............ 65/18; 65/21; 65/120; 65/DIG. 16; 117/46 FS; 117/106 R
[51] Int. Cl.... C03b 23/20; C03c 7/00; C03b 25/00
[58] Field of Search............. 65/18, 21, DIG. 7, 33, 65/120, DIG. 16; 117/46 FS, 106 R, 105.2

[56] References Cited
UNITED STATES PATENTS

| | | | |
|---|---|---|---|
| 2,967,113 | 1/1961 | Liebahfsky et al. | 117/106 R |
| 2,993,809 | 7/1961 | Bueche et al. | 117/106 R |
| 3,535,890 | 10/1970 | Hansen et al. | 65/18 |
| 3,642,521 | 2/1972 | Moltzah et al. | 117/105.2 |
| 3,741,796 | 6/1973 | Walker | 117/105.2 |

Primary Examiner—S. Leon Bashore
Assistant Examiner—Frank W. Miga
Attorney, Agent, or Firm—Clinton S. Janes, Jr.; Milton M. Peterson; Clarence R. Patty, Jr.

[57] ABSTRACT

A method of producing a glass body composed of two or more oxides by the flame hydrolysis technique, for example incorporating an additive or dopant oxide in a fused silica glass body. The method comprises forming a gas stream containing vapors of a compound that will hydrolyze to a glass forming oxide, e.g., silicon tetrachloride ($SiCl_4$), nebulizing an oxide forming compound or solution of such compound to form a mist in the nature of an aerosol, and simultaneously directing the mist and gas stream into a flame of combustible gas to form and codeposit a mixture of oxides corresponding to the vaporized and nebulized compounds.

10 Claims, 1 Drawing Figure

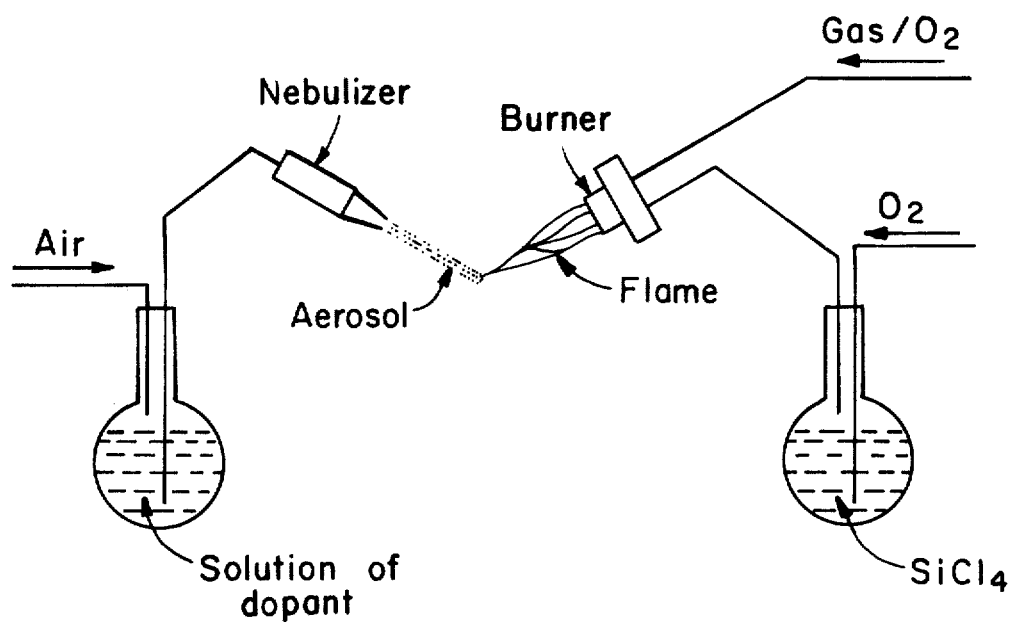

METHOD OF PRODUCING GLASS IN A FLAME

U.S. Pat. No. 2,272,342, granted Feb. 10, 1942 to J. F. Hyde, describes the flame hydrolysis technique of producing glass with reference to the production of pure fused silica, that is a glass composed entirely of silica ($SiO_2$). As described by Hyde, a stream of gas carrying a hydrolyzable compound of silicon in vapor form is introduced into a flame of combustible gas. The compound of silicon is hydrolyzed in the flame to form amorphous silica which may be collected in particulate form, or may be deposited on a mandrel or other support as a preform. The preform may be vitrified in position, or may be consolidated and vitrified by a separate heat treatment.

Subsequent patents, including U.S. Pat. No. 2,326,059 granted Aug. 3, 1943 to M. E. Nordberg, and U.S. Pat. No. 2,239,551 granted Apr. 22, 1941 to R. H. Dalton et al., describe methods of producing glasses by flame hydrolysis wherein the glass is composed of an oxide mixture, in particular a fused silica type glass incorporating small amounts of one or more additional oxides such as titania or alumina. In general, these methods involve forming a mixture of volatile compounds in the desired proportions in a stream of gas fed to a combustion burner. The mixture of vapors is then hydrolyzed to deposit a glass or preform containing a corresponding oxide mixture.

The mixed oxide glasses that can be produced by these earlier methods are limited by the ability to obtain materials that are relatively volatile and that may be hydrolyzed and decomposed in accordance with the flame hydrolysis technique. Even when suitable volatile compounds are available, it is often difficult to control proportions in the final product.

A copending application, Ser. No. 208,168 filed Dec. 15, 1971 in the names of P. C. Schultz and F. W. Voorhees now U.S. Pat. No. 3,801,294, describes a modified vapor generating procedure wherein a carrier gas is passed through a heated fluidized bed or layer of a particulate material to entrain vapors of the material. My application, Ser. No. 432,572, filed of even date herewith and also entitled "Method of Producing Glass," discloses a method wherein particles of a finely divided material are entrained in a carrier gas and the oxide thereof is codeposited with an oxide produced from a hydrolyzed vapor. Likewise, copending application, Ser. No. 407,918 filed in the name of P. C. Schultz and entitled "Method of Producing Glass by Flame Hydrolysis," discloses a method wherein a porous preform, of the nature described by Hyde, is impregnated in part at least to introduce a desired oxide. Each of these methods has certain advantages, but no one of them provides the capability of precisely varying and controlling composition to the degree required in producing certain optical type products. It is the purpose of the present invention to meet this need.

The present invention provides a completely novel approach to the problem of producing by flame hydrolysis glasses that are composed of a mixture of oxides, in particular a fused silica type glass containing one or more additive oxides. Further, it provides a convenient means of introducing such additives in a uniform manner and in controlled amount. The invention is based on my discovery that the flame hydrolysis procedure can be applied to a mixture of hydrolyzable vapors and nebulized liquid, to produce a mixed oxide preform or glass and thereby achieve the desired purposes.

The invention is a method of producing by flame hydrolysis a glass body composed of two or more constituent oxides which comprises forming a gas stream containing vapors of a compound that will hydrolyze to a glass forming oxide in a combustion flame, nebulizing a liquid to form an aerosol, the liquid being an oxide forming compound or solution of such compound, and simultaneously passing the vapor stream and the aerosol into a combustion flame to form and codeposit a uniform mixture of oxides corresponding, respectively to the vaporized and the nebulized materials. A specific embodiment of the invention provides a method of producing a fused silica glass body by the flame hydrolysis technique wherein the glass contains at least one additive or dopant oxide.

The invention is of particular interest in, and hence is described in detail with respect to, the production of modified or doped fused silica type glass bodies. However, it will be understood that the invention is not limited to this type of glass, but may be employed as well in the production of glasses based on other glass forming oxides. For example, a germanium oxide ($GeO_2$) type glass body may be produced by mixing vapors of germanium chloride ($GeCl_4$) with a suitable material that is convertible to the corresponding oxide. It will also be apparent that other types of fused oxide glasses, such as $B_2O_3$, $P_2O_5$ and $SeO_2$ glasses, may be produced by suitable selection of materials.

In practicing the invention, a gas stream is provided containing the vapors of at least one material that will hydrolyze to an oxide in a combustion flame. The vaporizable material may be any of the metal halides, metal organics, or other compounds that are suitable for the conventional flame hydrolysis process of glass production. The selected material may be volatilized in conventional manner, for example by heating in a water bath and/or entrainment by a carrier gas. Alternative procedures involving generation of vapors from a fluidized bed are described in copending application, Ser. No. 208,168, mentioned earlier.

Simultaneously, a second material, thermally convertible or decomposable to a stable oxide, is nebulized to form a mist. This mist is composed of colloidal size droplets and is in the nature of an aerosol. The material employed may be a liquid itself, such as a liquid organometallic compound. Alternatively, it may be an aqueous or non-aqueous solution of any suitable compound. For example, acetates, nitrates, hydroxides, oxides and halides of sodium, lead, cobalt, barium, aluminum and boron have been employed to produce additive oxides in fused silica glasses.

The basic requirement is that a liquid be converted to extremely small size droplets that will produce oxide particles having a size in the same magnitude as that of the silica particles formed by flame hydrolysis. In general, the particles formed should not exceed 1 micron in size and preferably are less than ½ micron. Larger particles fail to completely combine with the basic glass former, e.g. silica, and tend to produce solid inclusions in the glass. To this end then, it is desirable that the droplets in the aerosol be relatively uniform in size and not exceed about ten microns.

It is possible to achieve the requisite small droplet size with ordinary spray equipment. However, such a spray usually lacks uniformity and contains a sufficient number of large droplets so that inclusions occur in the resulting glass.

It has now been found that the desired uniformity of small droplet size can be achieved by a practice known as impaction. In usual spray practice, an aspirated stream of large droplets is split into smaller droplets. In contrast, the impaction practice involves directing an aspirated stream under pressure against a surface, for example a body of the liquid being dispersed, to effectively shatter large droplets into numerous small droplets. Commercial devices for carrying out this process are available as referred to later.

An alternative is described in the May, 1973 issue of Popular Science, pp. 102–104, 162, 164. This procedure involves flowing a thin film of liquid over a spherical surface, and disrupting the film with a countercurrent of air to nebulize the liquid.

The vapor stream and the aerosol may be passed through separate burners, or the aerosol may be directed into the flame in which the silicon compound, or other glass former, is being hydrolyzed. The turbulence of the flame results in homogeneous intermingling and codeposition of the oxides formed.

The vitrified oxide particles formed may be deposited as a non-porous glass boule in accordance with conventional manufacturing practice. Alternatively, they may be deposited, at a somewhat lower temperature, as a porous preform on a suitable support or mandrel. Compositional control of the oxide mixture produced is achieved in part by controlling the flow rates of the two gas streams, and thereby the relative proportions of the vapor material and aerosol introduced into the flame. As explained later, flame temperature and position are also significant factors.

If the oxide mixture is deposited in a dense sintered form, commonly referred to as a preform, this preform may be given a subsequent heat treatment which consolidates the porous body into a non-porous vitreous body. This consolidating heat treatment may be an overall heating of the preform body as disclosed in the patents mentioned above. Alternatively, the heat treating process described in application Ser. No. 239,742, entitled "Method and Apparatus for Producing High Quality Fused Silica" and filed Mar. 30, 1972 in the names of J. S. Flamenbaum et al. now U.S. Pat. No. 3,806,570, may be employed. In accordance with the latter procedure, the preform is subjected to a progressive heat treatment by slowly passing it into or through a thermal zone wherein consolidation takes place. This process has the advantage of minimizing gas inclusions in the body of the consolidated glass.

The invention is further described with particular reference to the preferred embodiment (fused silica glasses) and to the accompanying drawing wherein the single figure is a schematic illustration of a simple apparatus for practice of the invention.

The drawing shows a stream of carrier gas (oxygen) being introduced from an external source (not shown) into a flask of silicon chloride ($SiCl_4$) to produce a stream of gas containing entrained silicon chloride vapors. This oxygen-vapor stream is passed into a combustion burner which is also supplied with a gas-oxygen mixture to form a flame. The $SiCl_4$ is hydrolyzed in such flame to form minute particles of silica. These particles may be collected in particulate form, as a preform composed of coherent particles, or as a glassy boule, in accordance with procedures known in the art.

This portion of the drawing illustrates conventional practice as described in the patents mentioned earlier.

Any suitably volatile silicon compound, such as any of the halides, a silane, or a halogen derivative thereof, might be substituted in the flask to provide vapors in the carrier gas stream. The chloride is particularly suitable because it is readily volatilized. If desired, the chloride, or other liquid, may be heated in a water bath for faster evolution of vapors. Those familiar with this art will of course readily appreciate that other volatile compounds that undergo a suitable transformation, e.g. germanium chloride, might be substituted for the $SiCl_4$ shown.

In accordance with the present invention, a stream of liquid (shown as a "solution of dopant") is aspirated by air pressure from a container into a nebulizer which converts the liquid into an aerosol as described earlier. The nebulizer may for example be a simple arrangement wherein aspirated liquid is forcefully directed against the liquid surface in a container to form the desired aerosol.

Alternatively, an impaction device, supplied by Sonic Development Corporation under Code No. 52H and described in their Bulletin S-100, may be employed. Likewise, a thin film nebulizer, as described earlier, might be employed. In any case, the aerosol is directed toward the combustion flame of the burner in which $SiCl_4$ is converted to silica. Thus the two oxides form within the flame, are intermingled by the turbulence, and are codeposited therefrom.

The invention is further illustrated by several specific examples of its practice with reference to the drawing.

EXAMPLE I

Cobalt chloride ($CoCl_2$) was dissolved in methanol to provide 3 liters of 0.1 M solution. This solution was placed in a reservoir from which it was aspirated into a nebulizer in the form of an impaction nozzle. This nozzle is specially designed to produce an aerosol by impaction of a liquid stream within a metal cap. The nozzle may be adjusted to produce aerosols with droplet sizes ranging from submicron up to about ten microns.

The methanolic solution of cobalt chloride was thus nebulized at a rate of 66 cc/minute to form an aerosol. This was fed as a cone-shaped mist into the flame of a burner supplied with natural gas at 0.4 cubic feet per minute (cfm) and oxygen at 0.35 cfm. A stream of gas and vapor was simultaneously produced by bubbling oxygen at a rate of 2,800 cc/minute through a container of liquid $SiCl_4$ at 25°C. This stream was passed through the burner and into the flame thereof simultaneously with the $CoCl_2$ solution. The $SiCl_4$ vapors hydrolyzed to $SiO_2$ while the methanol burned and the $CoCl_2$ converted to cobalt oxide (CoO). The oxides mixed in the turbulence of the flame to form a uniform dispersion of CoO in silica which was deposited on a mandrel to form a preform.

The mandrel was a five (5) mm. o.d. fused quartz tube 6 inches in length attached to a ¾ inch diameter handle. The mandrel was rotated at 180 rpm while being translated in a reciprocating manner at 16 inches per minute and at a distance of seven inches from the flame.

An even coating of the two oxides was deposited for a period of about one hour. The resulting preform was removed and slowly lowered through the hot zone (1,450°C.) of a helium atmosphere induction furnace at a rate of 15 inches per hour. The resulting glass body was pale blue, transparent, and contained 4 p.p.m. CoO as determined by mass spectographic analysis.

EXAMPLE II

A 0.05 M solution of chromium trioxide ($CrO_3$) was aspirated and nebulized by the system of Example I from a container pressurized at 4 psig. and providing a solution flow rate of about 2 liters/hour. The outlet of the aspirator assembly was positioned 15 inches from and directed toward a burner flame as in Example I, whereby a cone shaped mass of aerosol was directed into the flame.

The burner flame was fed by an oxygen stream at 0.32 cfm and natural gas at 0.27 cfm. A gas-vapor stream was produced by passing oxygen at a rate of 2,800 cc/minute through $SiCl_4$ liquid at 25°C. and was fed through the burner into the flame.

The resulting oxide mixture was collected, and the preform consolidated to a glass, as in Example I. The glass was pale green, transparent, and showed less than ten p.p.m. chromium oxide by spectrographic analysis.

EXAMPLE III

The procedure of Example II was repeated with identical conditions and materials, except that a 1.15 M solution of $CrO_3$ was employed. The resulting glass was extremely dark green in color, showed signs of devitrification occurring, and was found to contain 200 p.p.m. $Cr_2O_3$.

EXAMPLE IV

The procedure of Example II was repeated with changes in both conditions and materials. A 0.375 M solution of ammonium borate (($NH_4)_2B_4O_7$) was aspirated and nebulized to form an aerosol. This was delivered to the burner, as previously, but at different distances from the burner and under different tank pressures. In summary, the aerosol was delivered, (1) at a distance of 18 inches and at a solution flow rate of 35 cc/minute, (2) at a distance of 19 inches and at a solution flow rate of 50 cc/minute and (3) at a distance of 20 inches and at a solution flow rate of 66 cc/minute.

At the same time an oxygen-$SiCl_4$ vapor stream was delivered as before, but the distance of the burner nozzle from the bait upon which the oxides were deposited was varied in the three runs as (1) 7½ inches; (2) 6 inches, and (3) 6½ inches.

The oxides were deposited and consolidated as before, producing clear, uncolored glass in each case. On analysis, the three glasses contained (1) 6.8% $B_2O_3$, (2) 3.8% $B_2O_3$, and (3) 5.2% $B_2O_3$. This suggests that increasing the borate flow rate, while increasing the $B_2O_3$ produced, does not have as much influence as varying the spacing of the $SiO_2$ producing burner from the bait.

EXAMPLES V AND VI

Lead oxide (PbO) was introduced into fused silica as an additive using two different lead compounds. In each instance, a lead compound solution was nebulized to form an aerosol with the impaction procedure described in Example I.

In the first run, a 1.0 M aqueous solution of lead nitrate ($Pb(NO_3)_2$) was nebulized and the aerosol directed at a burner flame from a nozzle positioned 43 inches from the flame, the solution being consumed at a flow rate of 70 cc/minute. Simultaneously, $SiCl_4$ vapors were delivered to the oxy-gas burner as in Example I with the burner nozzle 5 inches from the fused quartz bait upon which the mixed oxides were deposited.

In the second run, a 2.75 M solution of lead perchlorate ($Pb(ClO_4)_2$) was nebulized and delivered as before with the nozzle positioned 42 inches from the bait. The $SiCl_4$ vapors were delivered as before, but the burner was positioned 5 1/2 inches from the bait.

Subsequent glass analyses showed 150 p.p.m. PbO in the glass of the first run and 140 p.p.m. in the glass of the second run.

EXAMPLE VII

A further test was conducted to determine influence of flame temperature and burner position on oxide proportions. In this test a 0.5 M solution of $Pb(NO_3)_2$ was nebulized at a rate of 70 cc/minute and the aerosol directed at a flame through a nozzle positioned 38 inches from the flame.

$SiCl_4$ vapors were delivered, as previously, to a combustion burner. However the burner gas flows were reduced to 0.27 cfm gas and 0.30 cfm oxygen, thus providing a less intense and cooler combustion flame. In turn, the burner nozzle was moved back to 6 inches from the bait upon which the oxides were being deposited.

The preform thus produced was consolidated, as previously, to a clear glass which, upon analysis showed 1.09% by weight lead oxide (PbO). This indicates the necessity for maintaining constant flame temperature and position for consistent compositions. It also illustrates the manner in which these conditions may be varied to achieve compositional variations.

I claim:

1. A method for making a transparent, homogeneous glass body consisting of at least two constituent oxides comprising the steps:
    a. entraining within a gas stream vapors of a compound of $SiO_2$, $GeO_2$, $B_2O_3$, $P_2O_5$, and $SeO_2$ that will hydrolyze in a flame to produce the corresponding glass forming oxide in particulate form;
    b. nebulizing a solution containing a metal oxide or a metal compound thermally convertible by heat treatment in a flame to a stable metal oxide into an aerosol consisting of substantially uniformly-sized droplets that do not exceed about 10 microns in diameter; and
    c. simultaneously passing said vapors and said aerosol into the flame of a combustion burner to form and codeposit a homogeneous oxide mixture as a glass body free from inclusions.

2. The method of claim 1 wherein said vapors consist of a silicon compound.

3. The method of claim 1 wherein the aerosol is an aqueous salt solution.

4. The method of claim 1 wherein both said vapors and said aerosol are passed into the same flame.

5. The method of claim 1 wherein said vapors and said aerosol are passed into separate flames.

6. A method for making a transparent, homogeneous glass body consisting of at least two constituent oxides comprising the steps:
    a. entraining within a gas stream vapors of a compound of $SiO_2$, $GeO_2$, $B_2O_3$, $P_2O_5$, and $SeO_2$ that will hydrolyze in a flame to produce the corresponding glass forming oxide in particulate form;

b. nebulizing a solution containing a metal oxide or a metal compound thermally convertible by heat treatment in a flame to a stable metal oxide into an aerosol consisting of substantially uniformly-sized droplets that do not exceed about 10 microns in diameter;

c. simultaneously passing said vapors and said aerosol into the flame of a combustion burner to form and codeposit a homogeneous oxide mixture as a porous preform; and then d. consolidating said porous preform into a nonporous glass body free from inclusions by heat treatment thereof.

7. The method of claim 6 wherein said vapors consist of a silicon compound.

8. The method of claim 6 wherein the aerosol is an aqueous salt solution.

9. The method of claim 6 wherein both said vapors and said aerosol are passed into the same flame.

10. The method of claim 6 wherein said vapors and said aerosol are passed into separate flames.

* * * * *